United States Patent [19]

Garnier et al.

[11] Patent Number: 4,904,293
[45] Date of Patent: Feb. 27, 1990

[54] PRODUCTION OF HIGH SILICA GLASS MICROSPHERES

[75] Inventors: Patrick Garnier, Paris; Daniel Abriou, Gagny; Benoit Beghin, Paris, all of France

[73] Assignee: Saint Gobain Vitrage, Courbevoie, France

[21] Appl. No.: 227,401

[22] Filed: Aug. 2, 1988

Related U.S. Application Data

[63] Continuation-in-part of Ser. No. 20,800, Mar. 2, 1987, Pat. No. 4,778,502, which is a continuation-in-part of Ser. No. 747,141, Jun. 20, 1985, Pat. No. 4,661,137.

[30] Foreign Application Priority Data

Aug. 5, 1987 [FR] France ............................... 87 11126

[51] Int. Cl.$^4$ ............................................. C03B 19/10
[52] U.S. Cl. ........................................ 65/21.4; 65/22; 65/31
[58] Field of Search ............................. 65/21.4, 22, 31

[56] References Cited

U.S. PATENT DOCUMENTS

| | | | |
|---|---|---|---|
| 2,221,709 | 11/1940 | Hood et al. | 65/31 X |
| 3,061,495 | 10/1962 | Alford | 65/31 X |
| 4,547,233 | 10/1985 | Delzant | 65/22 X |
| 4,778,502 | 10/1988 | Garnier et al. | 65/21.4 |

FOREIGN PATENT DOCUMENTS 1216976  4/1960  France .
1076224  7/1967  United Kingdom .

Primary Examiner—Robert L. Lindsay
Attorney, Agent, or Firm—Pennie & Edmonds

[57] ABSTRACT

Production of microspheres having a very high silica content produced from a starting glass whose silica content is less than 80% by weight, with the remainder being essentially made up of boron oxide and one or more alkaline oxide(s). This starting glass is reduced into fine particles by grinding, optionally mixed with a fluidizing agent, and then passed through the flame of a burner at a temperature at least equal to 1500° C. to form molten hollow microspheres which are suddenly cooled to form solid hollow microspheres. The microspheres produced thereby are recovered and contacted with a dealkalization agent to increase the silica content thereof to at least 92%.

22 Claims, 3 Drawing Sheets

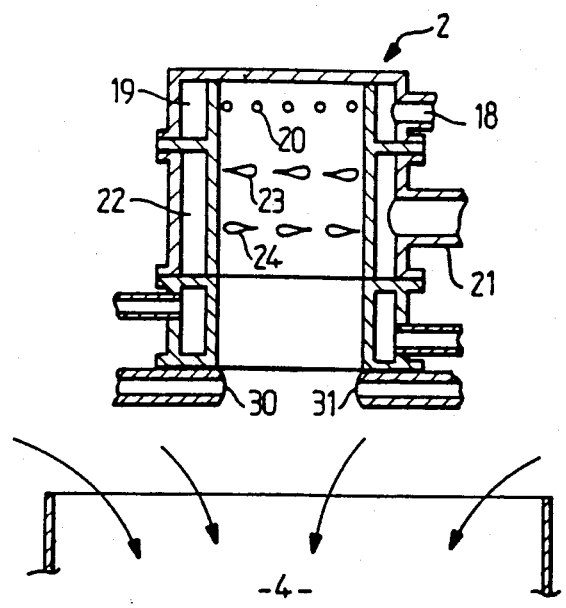
FIG_1
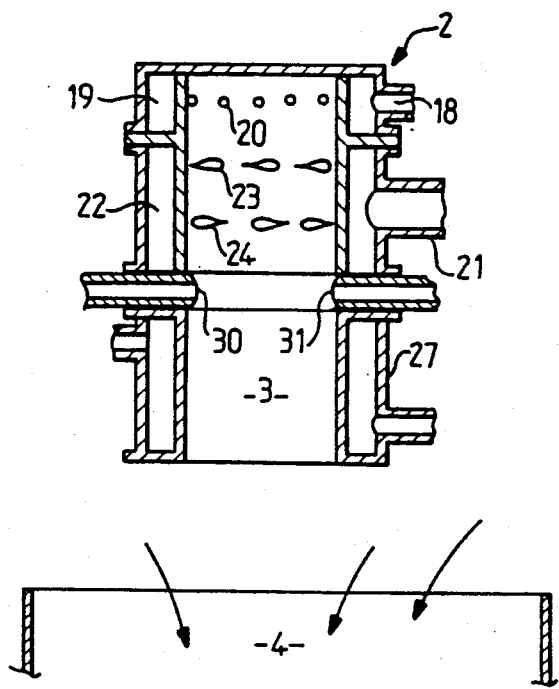
FIG_2

PRODUCTION OF HIGH SILICA GLASS MICROSPHERES

CROSS-REFERENCE TO RELATED APPLICATION

This application is a continuation-in-part of Ser. No. 20,800, filed Mar. 2, 1987, now U.S. Pat. No. 4,778,502, which is a continuation-in-part of application Ser. No. 747,141, filed June 20, 1985, now U.S. Pat. No. 4,661,137.

TECHNICAL FIELD

The invention relates to the production of glass microspheres having a very high silica content.

BACKGROUND ART

Inorganic microspheres are products known particularly as fillers in certain composite materials, in particular as fillers in synthetic resins or concretes. For these uses, the inorganic microspheres ordinarily consist of a soda lime silica glass of the type of those conventionally utilized for the production of glazings, for example. These materials are suitable for treatment ending in the production of microspheres which exhibit a set of satisfactory qualities.

However, for certain specific applications, it is necessary to resort to microspheres exhibiting a refractory character which is greater than that of conventional glass microspheres.

Production of conventional glass microspheres is performed industrially by subjecting glass particles to a heat treatment followed by an instantaneous cooling. Gases are released from the glass composition by the high temperatures utilized to assure the expansion of the particles. During the cooling step which follows, the molten glass hollow spheres are immediately solidified to prevent collapse thereof. This treatment is performed, for example, by passing the glass particles through the flame of a burner operating at high temperatures, followed by cooling with large volumes of ambient air.

This technique is possible because of the relatively low softening and melting temperatures of conventional glasses. For glass particles with a high silica content (more than 90% by weight), the temperature for which a satisfactory viscosity for the formation of spheres is reached, a viscosity whose logarithm is close to 2, is close to 1700° C. and never less than about 1600° C. Under these conditions, a treatment of the conventional type for the production of glass microspheres is not possible.

To get around this difficulty, the techniques previously proposed for the production of microspheres with a high silica content include the production of a borosilicate gel. This technique has been described many times, particularly in U.S. Pat. No. 4,336,338. Production of microspheres according to this technique comprises the formation of a borosilicate gel in an aqueous medium with various solvents, drying of the gel, grinding and a relatively complex heat treatment by making the particles pass in a furnace exhibiting several successive zones kept at different temperatures. Thus, such a process is a relatively delicate, complex and expensive mode of production.

The invention proposes a new technique of production of microspheres with a high silica content which avoids the passage through a gel phase and the resulting drawbacks.

DESCRIPTION OF THE INVENTION

According to the invention, production of microspheres with a high silica content comprises forming a glass whose silica content is less than 80%, the rest consisting essentially of boron oxide and alkaline oxides, grinding the glass thus formed to particles whose dimensions are less than 100 micrometers, passing these particles through the flame of a burner whose temperature is kept above 1500° C., followed by a sudden cooling to form microspheres, and treating the thus produced microspheres by means of compositions known for surface dealkalization of glass.

By "microspheres having a high silica content" is meant products whose composition by weight is at least 92% of silica and, preferably at least 95% of silica. These products, made up of unicellular hollow microspheres, exhibit, relative to similar products formed of traditional glasses, a notably increased thermal resistance.

Starting with a glass whose content is less than 80% of silica, and preferably with a silica content between 60 and 80%, a complement consisting essentially of boron oxide and alkaline oxides is added so that the viscosity conditions necessary for the treatment can be maintained in a range which is compatible with the heat treatment in the burner flame. The softening temperatures for a glass of these initial particles remains less than about 1400° C. so that their treatment can be performed satisfactorily in a burner whose temperature is about 1500° C. or more. The most preferred temperature is that for which the logarithm of the viscosity is equal to 2. This difference between the softening temperature and that of the flame is sufficient to treat very small particles whose temperature lag is consequently slight.

The dimensions of the initial particles are less than 100 micrometers and, usually, less than 50 micrometers. The most used dimensions are less than 30 micrometers and most often between 2 and 25 micrometers, which makes it possible to obtain very small microspheres for use as fillers. With the smallest particles, it is thus possible to obtain microspheres whose average dimensions are less than 20 or even 10 micrometers. Generally the microspheres produced according to the invention have average dimensions that do not exceed 200 micrometers and advantageously are less than 100 micrometers. It should be stressed that with the techniques considered, it is possible to obtain directly, i.e., without sorting by grain size after the heat treatment, a product with a great homogeneity. This is all the more important, the smaller the desired microsphere dimensions. For example, a product is obtained directly whose weight content in microspheres of less than 20 or 10 micrometers is equal to or greater than 90%. The homogeneity in the distribution by grain size which can thus be obtained for the very small microspheres is, of course, also obtained for those with larger dimensions. The only condition in both cases is to start with particles of quite homogeneous dimensions.

The glass of the particles contains a significant content of alkaline oxide to assure a sufficient fusibility of the particles which promotes the formation of spheres. A large part of the alkaline oxide content is eliminated during treatment in the flame. Still the total content of alkaline oxides is no greater than 25% and, preferably is less than 15%, to limit the extent of the final dealkalization treatment. The alkaline oxide content in the final product ordinarily is not more than 4% and, advantageously, is less than 3%.

The presence of boron in the initial glass is useful, on the one hand, to contribute to the fusibility of the particles, and on the other hand, to promote the elimination of alkaline oxides during heat treatment. As a fusibility agent, boron, in equivalent content, is a little less effective compared with alkaline oxides. Relative to them, it exhibits the advantage of being more volatile at high temperature and therefore is eliminated from the glass relatively easily. Further, as indicated above, boron combines with the alkaline oxides to form borates that are also easily eliminated. On the contrary, to maintain the refractory properties of the microspheres produced, it is important that the boron oxide content in the final product be less than 5% and, preferably less than 4%. For this reason, the boron content of the initial particles ordinarily does not exceed 15% and, preferably is 10% or less. Preferably, the ratio of contents by weight of $B_2O_3$/alkaline oxides is kept between 0.5 and 2.

Besides the constituents listed above, the glass of the initial particles can contain a certain number of constituents whose overall content ordinarily does not exceed 5% altogether. Of these constituents, alumina ordinarily represents less than 3%. If necessary, it replaces a small portion of the silica in the refractory lattice. However, its content is limited so as not to alter the silica matrix of the final product. Substitution of alumina is such, for example, that in the final product the sum of silica and alumina is at least 93% by weight and, preferably, greater than 97%.

The starting glass may also advantageously contain a small amount of sulfur oxide content to promote the expansion of the particles during heat treatment.

Relative to the glasses used for the production of conventional microspheres, the glasses used according to the invention are distinguished particularly by the practically total absence of oxide of alkaline-earth elements. The role of alkaline-earths in the usual glasses is partly to complete the action of alkalines with regard to fusibility. On the other hand, the presence of alkaline-earths in the products reduces their refractory character. Moreover, the alkaline-earths cannot be eliminated during expansion treatment, nor later by means comparable to those used for alkalines. Therefore it is important to use glasses which are practically free of alkaline-earth oxides. Their content does not exceed, for example, 0.5% by weight of the composition.

The technique used for production of glass particles may include that described in U.S. Pat. No. 4,778,502. According to this document, the glass is ground by traditional means by adding, preferably, a fluidizing agent, particularly when it is desired to obtain particles of very small dimensions. These latter particles have dimensions, for example, less than 20 micrometers or even less than 10 micrometers. The fluidizing agent is a compound exhibiting a good affinity for glass. It comprises a polar part carrying, for example, hydroxyl groups or amine groups and a nonpolar part which promotes the independence of the treated particles. These fluidizing agents are products known for their surfactant properties. They include, for example, polyalkanol amines, monopropylene glycol or similar compounds, and are introduced in a small amount, ordinarily less than 0.5% by weight.

The particles ground to the desired dimension are sent through the flame of a burner according to the methods of the type of those described in U.S. Pat. No. 4,661,137. The particles are put in suspension in a gas stream and carried by it to a burner whose characteristics will be specified relative to the accompanying figures.

The treatment or burner flame temperature is at least 1500° C. and can go up to 1750° C. under the usual operating conditions by burners operating with natural gas. Treatment at these temperatures is maintained for only a fraction of a second. The expanded particles are immediately brought back to temperatures at which the material is solidified. This is obtained essentially by the mixture of the combustion gas carrying the microspheres with a considerable amount of air at ambient temperature.

The microspheres are recovered and then subjected to the dealkalization treatment.

After heat treatment, the glass constituting the walls of the microspheres is notably modified relative to the original glass. In particular, the alkaline oxide content is ordinarily less than 10%, even for the highest initial contents which are on the order of 20%. The dealkalization operation has the aim of bringing the alkaline oxide content below 4% and, preferably, below 3%.

The dealkalization treatment according to the invention is performed chemically. The microspheres are put in contact with a known dealkalization agent for surface treatment of glass articles. The dealkalization agent may include, for example: sulfurous anhydride, concentrated sulfuric acid, various sulfates, hydrochloric acid, chlorosilanes, especially tetrachlorosilane or any other compound known for dealkalization of glass.

Dealkalization according to the invention is preferably performed by the dry method and at high temperatures, on the order of 200–500° C., to accelerate the exchange. The upper temperature limit for this treatment is that beyond which the structure of the glass of the microspheres would be altered.

A preferred treatment is performed by means of ammonium sulfate. In this case, the temperature is advantageously maintained above 300° C. The treatment temperature is a function of the intensity of the exchange. In any case, a treatment extended beyond 2 hours does not contribute any additional dealkalization improvement. A treatment of one hour generally suffices to obtain the desired dealkalization.

The dealkalization treatment is preferably performed by batch in a furnace. It can also be performed continuously, if desired.

In this dealkalization step, the structure of the microspheres influences the result of the treatment. Since a surface treatment is involved, it is understood that, depending on the thickness of the walls of the spheres, the treatment should be more or less intense to arrive at a determined final level of alkaline oxides. With equal diameter, the thinner the walls and therefore the lower the density of the spheres produced, the easier the dealkalization. This thickness ordinarily does not exceed some tens of micrometers, which explains that a relatively light treatment makes possible the elimination of a large part of the alkaline oxides.

BRIEF DESCRIPTION OF THE DRAWINGS

The invention is described below, in detail, with reference to the drawing figures in which:

FIG. 1 represents, partially in cross-section, a chamber according to the invention in which the expansion of the particles is performed;

FIG. 2 represents a variation of the chamber of FIG. 1;

The device for producing microspheres, shown in FIG. 3, comprises the following elements: a fluidizing device 1 for suspending particles in a gas current for transporting the particles to a burner 2 for combustion, a combustion chamber 3 which initiates combustion, and a tempering enclosure 4. This part of the installation, in which the treatment leading to the expansion of the microspheres is performed, is followed by a series of elements whose role is to separate the formed spheres, on the one hand, from the gases that entrain them, and, on the other hand, from dust, unexpanded particles, or aggregates of particles glued to one another. In FIG. 3, the set of elements for recovery of the microspheres comprises a preselector 10, two cyclones 5 and 6 and a sleeve filter 7.

Figure 3:
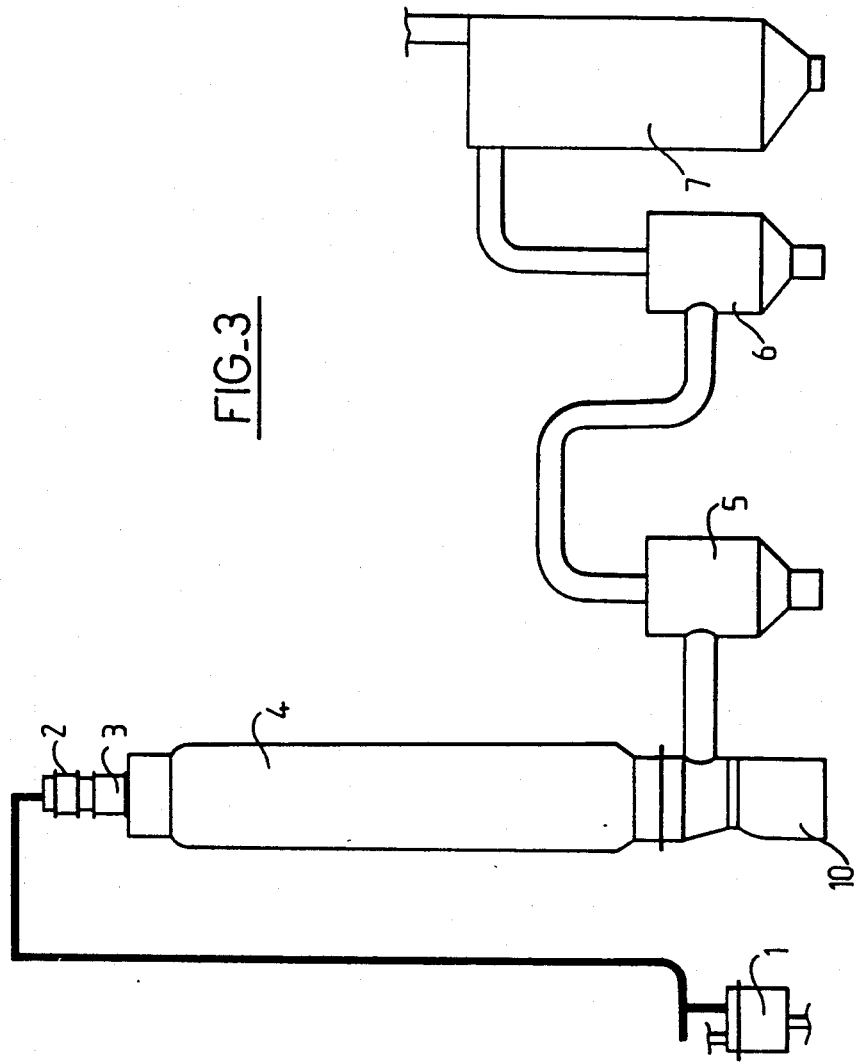
FIG. 3 is a flow overall diagram of a complete installation for forming microspheres according to the invention.

The glass particles are introduced into the burner flame under conditions which can be those described in U.S. Pat. No. 4,661,137, U.S. Pat. No. 4,778,502, or under slightly modified conditions. To the latter correspond the two types of installations represented in FIGS. 1 and 2.

In the configuration of FIG. 2, the gas current carrying the particles is introduced by ducts 30 and 31 into burner 2. FIG. 2 exhibits two orifices for introduction of the particles but, to distribute them uniformly into the flame, it is possible to provide a larger number of orifices, the orifices in this case being distributed uniformly around the burner. Feeding of the fuel gas is performed through orifices 20 communicating with annular chamber 19. Chamber 19 itself is fed by line 18. The air is brought by duct 21 into annular chamber 22 and then enters into the combustion zone by two series of orifices 23 and 24. These latter orifices are oriented so as to impart rotational movement to the air in opposite directions. The burner is extended by a combustion chamber 3, delimited by a double metal wall 27, in which a cooling liquid circulates. Immediately after the combustion chamber, the particles and combustion gases are directed to cylindrical enclosure 4 which is open to the surrounding atmosphere. Passage from combustion chamber 3 to enclosure 4 is accompanied by a very large input of ambient air which makes it possible to achieve a very sudden temperature drop. The air-combustion gas mixture is brought in a fraction of a second from the temperature of the flame to a temperature less than the softening temperature of the glass. The expanded particles are then solidified.

The arrangement of FIG. 2 is well suited for treating particles with diameters on the order of about ten micrometers or less. The treatment time could be shortened even more for the smallest particles (i.e., those on the order of 1 to 10 micrometers). For this, a configuration of the type of that represented in FIG. 1 can be used. In this configuration, the introduction of particles by means of a carrier gas is performed, as previously, by orifices 30, 31 constituted by the ends of the pipes carrying the particles. These orifices are located immediately under the burner and are oriented so as to direct the particles toward the heart of the combustion gas flow.

EXAMPLE

The following glass composition is prepared in a conventional manner:

| $SiO_2$ | 72% | $Al_2O_3$ | 1% |
|---|---|---|---|
| $B_2O_3$ | 7% | $SO_3$ | 1.2% |
| $Na_2O$ | 18.8% | | |

This composition is ground to particles, 80% of which have a diameter of between 6 and 15 micrometers. These particles are passed into the flame of the burner of FIG. 1 at a feed rate of 5 kg/hr. The burner is fed by 12 m³/hr of gas and 110 m³/hr of air, with the flame temperature set at 1580°C.

Analysis of the microspheres produced shows the following composition:

| $SiO_2$ | 87% | $Al_2O_3$ | 1.1% |
|---|---|---|---|
| $B_2O_3$ | 2.2% | Various | 0.3% |
| $Na_2O$ | 9.4% | | |

Figure 4:
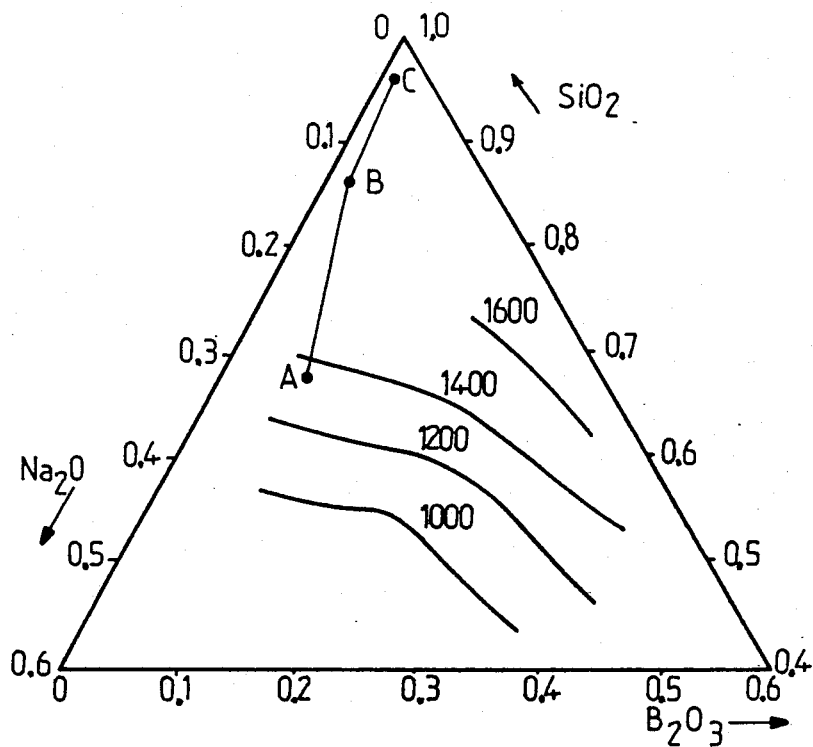
FIG. 4 is a ternary diagram of $SiO_2$, $B_2O_3$ and $Na_2O$ showing the development of the characteristics of the product in the different treatment stages.

Thus, a very large reduction of the boron and sodium oxide contents and a corresponding increase of the silica content is achieved. In the diagram of FIG. 4, which represents a ternary molar composition of the products according to the invention, this transformation is reflected by the passage from point A to point B.

In the diagram are also represented the curves corresponding to the different compositions which, for a given temperature, exhibit a viscosity whose logarithm is 2. It is seen in FIG. 4 that the composition of the example selected reaches this viscosity for a value on the order of 1200°C.

The microspheres thus obtained are then placed in a hermetic container with ammonium sulfate. The weight of the ammonium sulfate is about 20% of the weight of the microspheres. The container is brought to 550° C. within an hour in a furnace. After cooling, the microspheres are washed with water to eliminate any sodium sulfate which deposits on their surface. After washing, the analysis of the microspheres is as follows:

| $SiO_2$ | 95.2% | $Al_2O_3$ | 1.2% |
|---|---|---|---|
| $B_2O_3$ | 2.3% | Various | 0.3% |
| $Na_2O$ | 1.0% | | |

This chemical treatment makes it possible to reduce very clearly the sodium content of the microspheres without notably altering the content of the other constituents.

In FIG. 4, the dealkalization corresponds to the passage from point B to point C.

The real density of these microspheres, measured with a helium pyknometer, is established to be 0.36 g/cm³ with an average diameter of 15 micrometers.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A process for the production of hollow microspheres with a high silica content from a starting glass whose silica content is less than 80% by weight, with the balance being essentially boron oxide and one or more alkaline oxides, which process comprises:
   grinding the starting glass into fine particles;
   passing these fine particles through the flame of a burner at a temperature of at least about 1500° C. but less than about 1750° C. to form molten hollow microspheres;
   suddenly cooling the molten hollow microspheres to solid hollow microspheres;
   recovering the microspheres; and
   contacting the recovered microspheres with a gaseous dealkalization agent of a temperature greater than 200° C. but below that which would alter the structure of the microspheres to increase the silica content of the microspheres to at least 92%.

2. The process according to claim 1, wherein the content of alkaline oxides in the initial glass is selected to maintain the temperature, for which the logarithm of the viscosity is equal to 2, at less than 1400° C.

3. The process according to claim 1, wherein the content of boron oxide of the treated glass particles does not exceed 15%, and wherein the content of alkaline oxide of the treated glass particles does not exceed 15%.

4. The process according to claim 3 wherein the ratio of boron oxide to alkaline oxide of the starting glass is between about 0.5 and 2.

5. The process according to claim 1, wherein the starting glass particles contain less than 0.5% of alkaline-earth oxides.

6. The process according to claim 1, wherein the treated particles have a dimension between about 2 and 50 micrometers.

7. The process according to claim 1, wherein the dealkalization agent comprises sulfurous anhydride, concentrated sulfuric acid, hydrochloric acid, a sulfate, or tetrachlorosilane.

8. The process according to claim 7, wherein the dealkalization agent is ammonium sulfate and the dealkalization treatment is performed at a temperature greater than 300°C.

9. The process according to claim 1 which further comprises mixing a fluidizing agent in with the glass particles prior to passing said particles through the burner flame.

10. The process according to claim 9 wherein the fluidizing agent is an organic compound having a first part which exhibits an affinity for the glass and a second part which promotes the independence of the particles.

11. The process of claim 9 wherein the fluidizing agent is an alkanolamine or alkaline glycol.

12. A process for the production of hollow microspheres with a high silica content from a starting glass whose silica content is less than 80% by weight, with the balance being essentially boron oxide in an amount of 15% or less and one or more alkaline oxides in an amount of 15% or less, which process comprises:
   grinding the starting glass into fine particles;
   adding to said particles a fluidizing agent of an organic compound having a first part which exhibits an affinity for the glass and a second part which promotes the independence of the particles, said fluidizing agent added in an amount sufficient to reduce the forces of attraction of the particles but less than that which would reduce the fluidity of the mixture;
   passing these fine particles through the flame of a burner at a temperature of at least about 1500° C. to form molten hollow microspheres;
   suddenly cooling the molten hollow microspheres to solid hollow microspheres;
   recovering the microspheres; and
   contacting the recovered microspheres with a gaseous dealkalization agent of a temperature greater than 200° C. but below that which would alter the structure of the microspheres to increase the silica content of the microspheres to at least 92%.

13. The process ss according to claim 12, wherein the dealkalization agent comprises sulfurous anhydride, concentrated sulfuric acid, hydrochloric acid, a sulfate, or tetrachlorosilane.

14. The process according to claim 13, wherein the dealkylization agent is ammonium sulfate.

15. A process for the production of hollow microspheres having a high silica content from a starting glass whose silica content is less than 80% by weight, which process comprises:
   preparing a starting glass having a silica content of at least 60% but less than 80% by weight, with the balance being essentially boron oxide; one or more alkaline oxides in an amount sufficient to impart a softening temperature of less than about 1400° C. to the glass and less than 0.5% of alkaline earth oxides;
   grinding the starting glass into fine particles;
   passing the fine particles through the flame of a burner at a temperature of between about 1500° C. and 1750° C. for a time sufficient to form molten hollow microspheres;
   suddenly cooling the molten hollow microspheres to solid hollow microspheres;
   recovering the microspheres; and
   dealkalizing the recovered microspheres at a temperature of between about 200° C. and 500° C. to increase the silica content thereof to at least 92%.

16. The process according to claim 15, wherein the dealkalizing treatment comprises contacting the recovered microspheres with an agent comprising sulfurous anhydride, concentrated sulfuric acid, hydrochloric acid, a sulfate, or tetrachlorosilane for a sufficient time to increase the silica content of the microspheres.

17. The process according to claim 15 wherein the dealkalizing treatment is performed at a temperature of at least about 300°C.

18. The process according to claim 15 wherein the boron oxide content of the starting glass is 15% or less, the alkaline oxide content of the starting glass is 25% or less, and the ratio of boron oxide to alkaline oxide in the starting glass is between about 0.5 and 2.

19. The process according to claim 15 wherein the boron oxide content of the starting glass is 10% or less, the alkaline oxide content of the starting glass is 15% or less, and the ratio of boron oxide to alkaline oxide in the starting glass is between about 0.5 and 2.

20. The process according to claim 15 wherein the boron oxide content of the final microspheres is 5% or less and the alkaline oxide content is 3% or less.

21. The process of claim 15 wherein the starting glass contains sulfur oxide in an amount to promote the expansion of the particles during passage through the burner flame.

22. The process of claim 15 which further comprises mixing a fluidizing agent in with the glass prior to passing said particles through the burner flame.

* * * * *